Oct. 5, 1965 W. B. LOZIER, JR., ETAL 3,210,729

DATA DISPLAY SYSTEM

Filed Dec. 18, 1961 2 Sheets-Sheet 1

INVENTORS
WILLIAM B. LOZIER, JR.
WILLIAM S. ROHLAND
BY Paul M. Brannen
AGENT

DATA DISPLAY SYSTEM

Filed Dec. 18, 1961 2 Sheets-Sheet 2

United States Patent Office 3,210,729
Patented Oct. 5, 1965

3,210,729

DATA DISPLAY SYSTEM

William B. Lozier, Jr., Vestal, N.Y., and William S. Rohland, Fort Meade, Md., assignors to International Business Machines Corporation, New York, N.Y., a corporation of New York Filed Dec. 18, 1961, Ser. No. 159,914
1 Claim. (Cl. 340—146.3)

This invention relates to data display systems and particularly to an improved display system for visually indicating the presence of information in an information storage device.

Although not limited thereto, the invention has particular utility in displaying the pattern of information stored in a storage register employed in a character recognition system. Where the stored information represents the areal configuration of the character scanned, the display system can represent a visual reconstruction of the scanned character. A particular feature of this invention is the provision of recirculating stored information in the storage register to thereby make it possible to display a stationary image of the information contained therein.

A principal object of the invention, therefore, is to provide an improved form of data display system for visually displaying information contained in an information storage system.

Another object of the invention is to provide an improved form of data display system for visually displaying information contained in one or more stages of a multi-stage shift register storage device.

A further object of the invention is to provide an improved data display system for visually displaying information which is being recirculated in a storage device so that a stationary image of the information is obtained.

Another object of the invention is to provide an improved data display system for visually displaying information derived from the scanning of a character by a character recognition system to ascertain the operating condition of the character recognition system.

Still another object of the invention is to provide an improved data display system for a character recognition system which will display an areal configuration similar to the character scanned.

Briefly described, the present invention comprises a cathode ray oscilloscope of the conventional type, provided with conventional horizontal and vertical deflection circuits arranged so that the supply thereto of suitable synchronizing pulses causes the electron beam to be swept through a raster which corresponds to the areal configuration of an associated multi-stage storage device, such as a cascade connected shift register having a plurality of stages arranged in rows and columns. The intensity, or so-called "Z axis" control is arranged so that the brightness of the display is intensified only at those points corresponding to the locations in the storage device at which information is stored. Thus, the visual display consists of one or more bright spots in a raster area corresponding to these locations at which information is stored.

By causing the information in the storage device to be recirculated, a stationary display is afforded.

The foregoing and other objects, features and advantages of the invention will be apparent from the following more particular description of a preferred embodiment of the invention, as illustrated in the accompanying drawings.

In the drawings.

Similar reference characters refer to similar parts in each of the several views.

Figure 1:
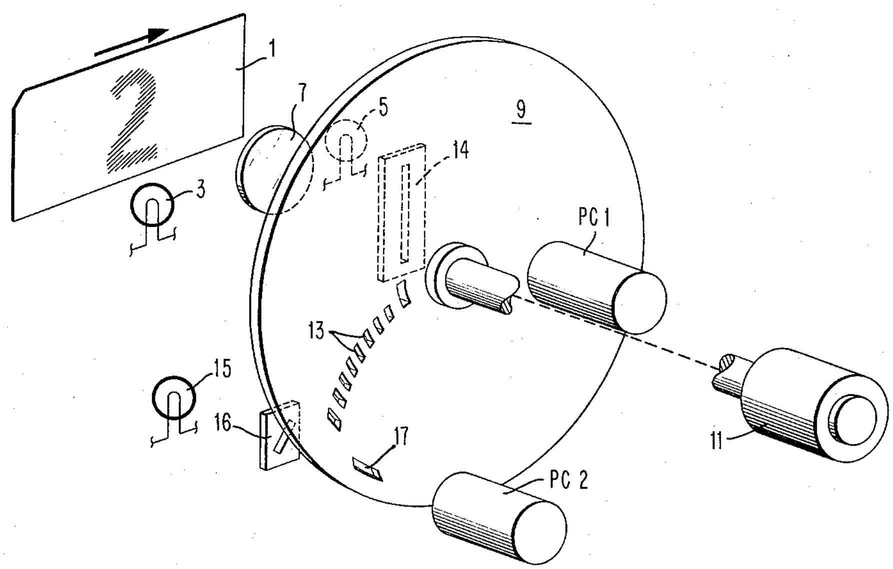
FIG. 1 is a diagrammatic view of an electromechanical scanning device for a character recognition system which can employ the present invention.

Referring now to the drawings, FIG. 1 shows one form of electro-mechanical scanning apparatus which can be used in a character recognition system which can advantageously employ the data display system constituting the present invention. Characters such as the character "2" shown on a document 1 are moved by a reading station in the direction shown by the arrow by suitable document transport means, not shown, since it forms no portion of the present invention. The document is brilliantly illuminated by lamps such as 3 and 5, and the image of the characters is focused by means of a suitable optical system indicated symbolically by a lens 7, onto a combined stationary and moving slit type of scanner, well known in the character recognition art. A scanning disc 9 rotated by means of a motor 11 is provided with a plurality of sets of scanning apertures one such set being indicated by reference character 13, the remaining sets of the scanning apertures not being shown in order to render the drawings more clear. The sets of apertures in the disc 9 scan across a vertical stationary scanning slit 14 in succession, with the image of the character to be scanned focused upon the slits, so that, in effect, the image is scanned by a plurality of short horizontal scans succeeding one another and traveling from the bottom to the top of the image, as can be seen from the drawing. The scanning signals are picked up by a photoresponsive device PC1 which may be a photomultiplier tube or other device which provides electrical signals corresponding to the variations in illumination received by the photoresponsive device. An auxiliary light source 15, a stationary slit 16, and a series of apertures, such as the apertures 17, provided around the periphery of the disc supplies pulses of light energy to a second photoresponsive device PC2, for timing purposes. The foregoing arrangement is well known in the art and the exact construction and arrangement of the parts are indicated only diagrammatically, since it may be varied in a number of well known manners and forms no part of the present invention.

Figures 2, 3:
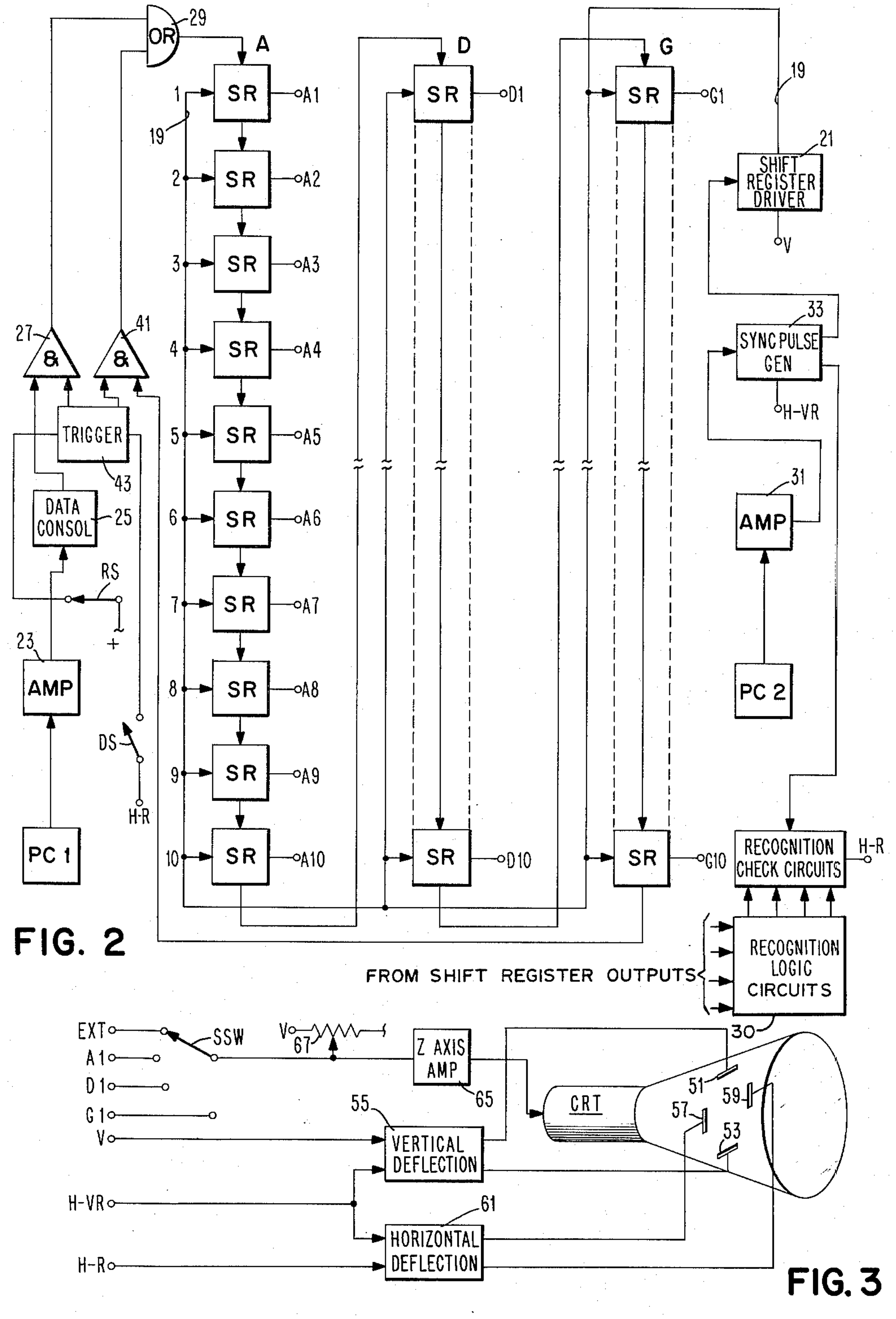
FIG. 2 is a diagrammatic view of a portion of a character recognition system, particularly of a multi-stage storage register.
FIG. 3 is a diagrammatic view of the cathode ray tube and associated circuits arranged according to the present invention.

Referring now to FIG. 2, there is shown in schematic form a portion of a character recognition system employing a storage matrix comprising a plurality of shift register elements connected in cascade. Each of these shift register elements, as indicated by the rectangles with the designation SR, is of conventional type and may be either vacuum tube or solid state electronic devices, including magnetic core shift registers. The detailed construction of the shift register stages is unimportant to an understanding of the present invention since they may take any one of a number of well known forms, and it is deemed sufficient to state that information supplied to a stage of the shift register is shifted therethrough upon supply to the stage of a suitable driving pulse. The shift register stages are arranged in rows and columns, the columns being designated by alphabetical designations such as columns A, D, and G, the rows being indicated by numbers such as the numbers 1 through 10. Even though the shift register is arranged in columns and rows, it will be seen that the output from the last stage at row 10 or the bottom of the first column A is connected to the input of the first stage in the next column indicated as column D at the top of the column or row 1 thereof. Thus, it can be seen that information supplied to the input of shift register stage 1 in column A will progress through the various stages of the shift register as determined by the supply to each of the stages of synchronizing pulses via a common driving line 19 supplied from a shift register driver unit 21, which may constitute a suitable pulse power amplifier, the control of which will be described subsequently. The information derived from scanning a document with the scanning arrangement illustrated in FIG. 1 and described hereinbefore is supplied from the photoresponsive device PC1 to an associated amplifier 23, and data consolidation circuits 25, the nature of which is unimportant to the present invention, suffice it to say that the output of the data consolidation circuits 25 consists of pulses which indicate whether or not black or white areas have been scanned by the photoresponsive device PC1. The output of data consolidation circuit 25 is supplied to one input of an AND circuit 27, the output of which is connected through an OR circuit 29 to the first stage of the shift register. It can be seen, therefore, that when AND circuit 27 is energized by a suitable signal supplied to the other input thereof that the scanning information will be supplied to the input of the shift register, and as previously pointed out will be shifted through the shift register step by step, so that the pattern of stored binary information indicating the presence or absence of black portions of the character will step through the shift register in the same sequence in which it is scanned. Therefore, it may also be noted that at some time during the progress of the digitalized character information through the shift register, the information therein will fall in the same type of two-dimensional representation as the actual character itself so that the pattern of output signals from the shift register stages at that time will be indicative of the exact nature of the character scanned. Each of the shift register stages is provided with an output terminal indicated by the column and row designation of the stage in question, thus the output of the first stage in column 1 has its output terminal designated as A1, the second row A2, etc., the stages in column D having output terminal D1, etc. The character recognition system includes logic circuits 30 which have their inputs connected to the selected ones of the outputs of the various shift register stages so that when predetermined combinations of information exists within the shift register as a whole, indicating the presence of information designating the scanning of a particular character, the output logic will provide outputs indicative of the character scanned. These logic circuits constitute simple combinational logic circuits and are not shown in detail since their actual structure is unnecessary to a knowledge of the present invention. Combinational logic circuits, which may be employed with the present invention, include "Christmas tree" relay type circuits shown, for example, in U.S. Patent 2,889,535, to Rochester et al., granted on June 2, 1959; or electronic combinational logic circuits of the diode matrix type or the conventional "AND" and "OR" types shown, for example, in U.S. Patents 2,738,499 to Sprick and 3,008,123 to Rohland et al., granted on March 13, 1956, and November 7, 1961, respectively.

Timing signals for determining the operation of various portions of the system are derived by circuits connected with the timing photoconductive device PC2, the timing impulses supplied therefrom being amplified by suitable amplifying and shaping circuits 31, from whence they are delivered to a sync pulse generator 33, which provides output pulses therefrom at predetermined levels of amplitude, duration times and relation to the primary timing signals for the operation of the subsequent portions of the circuit. The sync pulse generator 33 provides a signal to the shift register driver 21 to enable this driver circuit to supply outputs to the shift control line for the shift register, shift register driver 21 also supplies output pulses to a terminal V, used in connection with the cathode ray oscilloscope as subsequently described. Additional pulses for the cathode ray tube circuits are supplied from the sync pulse generator to a terminal H–VR which pulses are used in the operation of the cathode ray tube deflection circuits as will be subsequently explained. Sync pulse generator 33 also supplies pulses to recognition checking circuits which are supplied with signals from recognition logic as shown, the signals coming in on these lines indicating whether a particular character has been recognized by the logic circuits. These inputs from the recognition logic are combined with pulses supplied from the sync pulse generator 33 and are utilized to furnish pulses at a terminal designated by a reference character H–R, these pulses also being employed in connection with the cathode ray tube deflection circuits.

The output of the last stage in the shift register, in this case column G and row 10, is connected to one input of an AND circuit 41, the output of this circuit being connected to one of the inputs of OR circuit 29. It can be seen therefore that when AND circuit 41 is enabled by the supply thereto of energy to the other input, the output of the shift register is returned to the input, so that a recirculating path is established. Thus, it is possible for the shift register to hold information resulting from the scanning of the characters, or to have information which was originally derived from the scanning of a character recirculated through the shift register depending on whether AND gate 27 or AND gate 41 is active. These AND gates are controlled by the outputs from a suitable bistable trigger 43, conventional in nature and which has two outputs therefrom, either one or the other being active to thereby render either AND gate 27 or AND gate 41 "ON." The trigger 43 is provided with a resetting circuit including a switch here shown as a manually operable switch RS, which is normally closed and supplies an input to the trigger TR such that the trigger TR will supply an output which causes AND gate 27 to be active and AND gate 41 to be inactive. When it is desired to recirculate information within the shift register, the switch RS is opened and the switch DS is closed, whereupon the occurrence of the first H–R pulse from the recognition check circuits will be supplied through a circuit to the other side of trigger 43, thereby disabling AND gate 27 and enabling AND gate 41 so that the information contained in the shift register at that time will continue to recirculate through the register. Thus, in effect, it is possible to "capture" the scanning informative derived from the scanning of a figure in the shift register by utilizing an output from the recognition check circuits, which indicates that a figure has been scanned in the shift register, to close the recirculation path and open the entry path to the shift register.

FIG. 3 illustrates the connections of the cathode ray oscilloscope for displaying the information stored in the shift register storage. The cathode ray tube is of the conventional type, having a suitable electron gun for projecting a stream of electrons onto a fluorescent screen, and having deflecting means for altering the path of the electron beam so that various patterns or rasters may be traced out on the screen. The cathode ray tube CRT is also provided with a so-called Z axis or intensity grid, which is usual in cathode ray tubes will govern the intensity of the beam so as to either render it visible or invisible. The vertical deflection plates 51, 53 are supplied with suitable signals from a vertical deflection generator 55, while the horizontal deflection elements 57 and 59 are energized by signals supplied from horizontal deflection generator 61. The structure of the horizontal and vertical deflection generators are not shown, but these can be of the so-called staircase waveform generator type, in which the output voltages are a series of stepped portions of an increasing signal, i.e., the voltage supplied to the deflection plates increases periodically at specified intervals of amplitude and time. Staircase generators of this type are well known in the art, one such example being that described on page 352 of the text "Pulse and Digital Circuits," by Millman and Taub, copyright, 1956. Other types of deflection generators, such as conventional saw-tooth generators, may also be employed. The vertical deflection generator is set to a zero or reset condition by the signal H–VR, which is a raster signal which sets the vertical deflection to an initial condition upon the occurrence of the beginning of each group of the scans as was described in connection with FIG. 1 and the timing circuits of FIG. 2. With the vertical deflection generator set to zero output condition by the signal supplied from terminal H–VR, the successive pulses which step the shift register and which are supplied to terminal V are also supplied to the vertical deflection generator and cause the vertical deflection voltage to be increased in a predetermined number of steps corresponding to the number of stages in the columns of the shift register. In this manner, the electron beam position is shifted vertically one jump at a time, each of its stationary positions corresponding to a corresponding row in the shift register. Similarly, the horizontal deflection generator is set to an initial condition by the H–R pulse supplied from the recognition check circuitry, and is thereafter stepped in increments equal in number of columns in the shift register, by the pulses supplied from terminal H–VR, so that the electron beam position is shifted horizontally by jumps which equal in number the number of columns in the shift register.

It should be apparent from the foregoing, therefore, that the arrangement thus far described will cause the electron beam of the cathode ray tube to trace out a raster pattern of discrete points which correspond to a rectangular arrangement of rows and columns equivalent to the arrangement of the rows and columns of the shift register. Considering now the Z axis control, the electrode within the cathode ray tube is connected to the output of a Z axis amplifier 65, the input of which has a signal supplied thereto through a suitable intensity control 67 from terminal V. Accordingly, the grid of the electron gun will be modulated by the V pulses in synchronism with the driving pulses supplied to the shift register so that by regulation of the control 67 the electron beam may be momentarily brightened to a low level of illumination as it occupies each of its discrete raster positions. In this manner then, the face of the cathode ray tube when in operation normally presents a picture of relatively dimly illuminated spots arranged in rows and columns corresponding to the rows and columns of the shift register. The input to the Z axis amplifier is also connected through a selector switch SSW, which has one terminal connected through a terminal post marked EXT, this terminal post being useful for supplying some external signals if so desired, but also having three other connections going to terminals A1, D1 and G1. Accordingly, with the selector switch set to one of the column positions, it can be seen that the intensity of the electron beam will be modified by the presence or absence of information in the particular stage to which the selector switch is set. The various columns of the shift register may be connected through the selector switch to the Z axis amplifier so that, in effect, the image can be shifted to the right or left for alignment purposes. Actually, the Z axis control may be connected to any one or more of the shift register stages to provide horizontal or vertical shifting, or both. As the information progresses past the stage which is connected through the selector switch SSW to the Z axis amplifier, the presence of black or white information will cause the beam intensity either to be relatively bright or its normal value set by the control 67. Thus, the information progressing through the shift register will cause a brightening of those points at which information is contained designating that a black area has been scanned during that portion of the scanning operation. In order to render the character stationary, the trigger 43 is set as previously described by the opening of switch RS and the closing of switch DS, so that the information contained in the shift register is now recirculated. Upon this occurrence, of course, the persistence of vision phenomena will cause the image to appear stationary on the cathode ray tube screen where it may be examined for various features indicating alignment of the characters in the reading station, etc.

Figure 4:
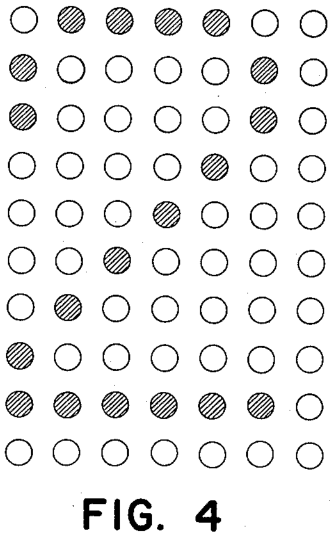
FIG. 4 is a diagrammatic view of the appearance of a typical display as afforded by this invention.

FIG. 4 shows an example of a type of pattern which may be displayed on the screen. Each of the raster positions is shown as occupying a particular point in a rectangular matrix or array. Certain ones of the raster spots are brightly lighted, indicated in this case by the shaded circles, which can easily be seen to show the trace of a figure 2, this being the scanning information contained in the matrix at that time.

From the foregoing, it is apparent that the present invention provides an improved form of data display system for data stored in a multi-stage shift register, and is particularly advantageous in providing a static image of an areal representation of a scanned character in a character recognition system.

While the invention has been particularly shown and described with reference to a preferred embodiment thereof, it will be understood by those skilled in the art that various changes in form and details may be made therein without departing from the spirit and scope of the invention.

What is claimed is:

In a character recognition system, the combination comprising:

means for serially scanning characters to be recognized,
means for digitalizing the scanning data supplied by said scanning means,
a multi-stage serial shift register to which the digitalized scanning data is serially supplied and shifted therethrough,
synchronizing means governed by said scanning means for controlling the shifting of said data through said shift register,
recognition logic means connected to said shift register to provide outputs indicative of the recognition of scanned characters, and
visual display means for visually displaying the data stored in said shift register comprising
a cathode ray tube,
deflection means governed by said synchronizing means for generating a dot pattern on said cathode ray tube, the pattern of dots constituting a representation of the stages of the shift register,
means connected to a selected one of the stages of the shift register for intensity modulating the cathode ray tube in accordance with the presence or absence of data in said selected stage, and
switching means governed by said recognition logic means for connecting the last stage of said shift register to the first stage for recirculating data in said shift register when the data therein represents a character recognized by said logic means.

References Cited by the Examiner

UNITED STATES PATENTS 3,017,625 1/62 Evans -------------- 340—324.1

MALCOLM A. MORRISON, *Primary Examiner.*